United States Patent
Su et al.

[11] Patent Number: 5,969,069
[45] Date of Patent: Oct. 19, 1999

[54] WATER-ACTIVATABLE POLYMERS AND PRINTABLE CONSTRUCTIONS

[75] Inventors: Shiaonung Su, Buena Park; H. Paul Barker, La Canada; Ghanshyam H Popat, Alta Loma; Frederick N. Miekka, San Gabriel; Raymond G. Kubit, Yorba Linda; Robert Valadez, Azusa, all of Calif.

[73] Assignee: Avery Dennison Corporation, Pasadena, Calif.

[21] Appl. No.: 08/701,767

[22] Filed: Aug. 26, 1996

Related U.S. Application Data

[63] Continuation-in-part of application No. 08/519,570, Aug. 25, 1995, abandoned.

[51] Int. Cl.$^6$ ..................................................... C08F 20/10
[52] U.S. Cl. .......................... 526/318.44; 526/318.4; 526/318.41; 526/317.1; 526/320
[58] Field of Search ........................... 526/318.4, 318.44, 526/318.41, 317.1, 320

[56] References Cited

U.S. PATENT DOCUMENTS

| | | | |
|---|---|---|---|
| 3,441,430 | 4/1969 | Peterson | 117/68.5 |
| 3,681,179 | 8/1972 | Theissen | 161/4 |
| 4,052,368 | 10/1977 | Larson | 260/75 |
| 4,074,004 | 2/1978 | Bateson et al. | 526/318.4 |
| 4,172,824 | 10/1979 | Harrington, Jr. et al. | 260/31.2 X |
| 4,181,752 | 1/1980 | Martens et al. | 526/318.4 |
| 4,325,581 | 4/1982 | Pickering | 303/22 |
| 4,331,576 | 5/1982 | Colon et al. | 524/271 |
| 4,339,485 | 7/1982 | Shibano et al. | 428/40 |
| 5,070,164 | 12/1991 | Min et al. | 526/318.4 |
| 5,326,644 | 7/1994 | Scholz et al. | 428/514 |
| 5,346,977 | 9/1994 | Sakai et al. | 526/318.4 |
| 5,407,718 | 4/1995 | Popat et al. | 428/42 |
| 5,536,787 | 7/1996 | Scholz et al. | 526/318.4 |

FOREIGN PATENT DOCUMENTS

| | | |
|---|---|---|
| 0199468 | 10/1986 | European Pat. Off. . |
| 0297451 | 1/1989 | European Pat. Off. . |

*Primary Examiner*—Bernard Lipman
*Assistant Examiner*—N. Sarofim
*Attorney, Agent, or Firm*—Christie, Parker & Hale, LLP

[57] ABSTRACT

Water dispersible, hydrophilic, repulpable, water-activatable, acrylic polymers are provided. The polymers are non-tacky when dry, but become tacky when wet, and exhibit high peel strength on a variety of substrates. The polymers comprise an acrylic-based polymer prepared by emulsion polymerization of 40 to 70% by weight of one or more alkyl acrylates, the alkyl group of which has from 4 to 8 carbon atoms; 10 to 20% by weight of methacrylate; 2 to 15% by weight of vinyl acetate; and 10 to 25 percent by weight of methacrylic acid and/or acrylic acid; and a positive amount up to about 30% by weight of methyl methacrylate. Some embodiments also include a short chain hydroxyalkyl methacrylate. Also provided are ink jet-imprintable, water-activatable constructions comprising a layer of water-activatable polymer, coated on a release liner or other surface. Optionally, a water-resistant transparent film layer is disposed between the polymer and release liner or used in place of the release liner. The constructions are suitable for use in ink jet printers and can be used to transfer an image to a substrate.

9 Claims, 2 Drawing Sheets

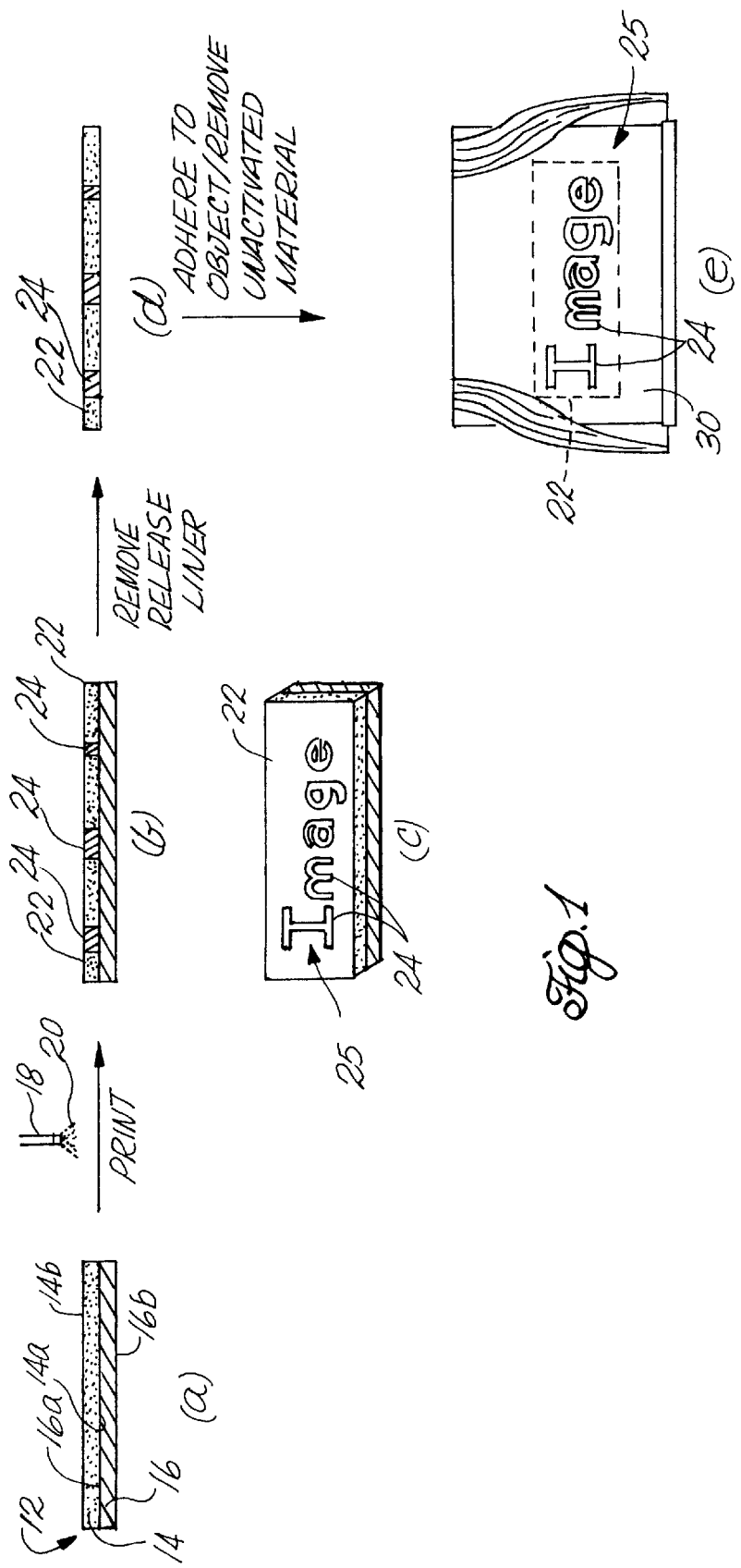

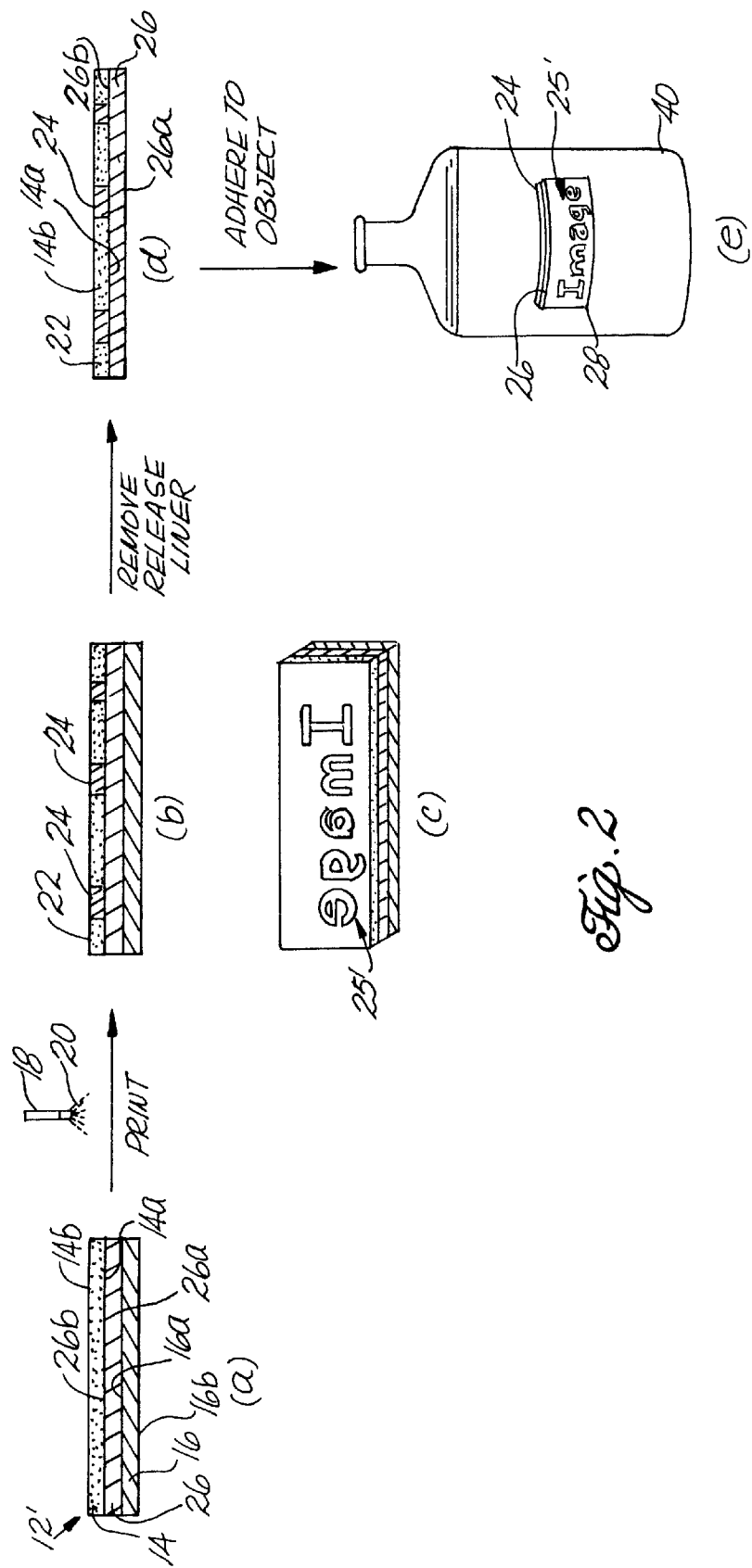

5,969,069

WATER-ACTIVATABLE POLYMERS AND PRINTABLE CONSTRUCTIONS

RELATION TO COPENDING PATENT APPLICATIONS

This is a continuation-in-part of U.S. patent application Ser. No. 08/519,570 filed on Aug. 25, 1995, abandoned.

FIELD OF THE INVENTION

This invention relates to polymers which are ink jet imprintable and can be used for adhesive image transfer, and constructions made with such polymers.

BACKGROUND OF THE INVENTION

Labels, tapes and similar constructions are ubiquitous in modern society. Many such constructions include a release liner coated with adhesive, such as a pressure-sensitive adhesive (PSA), which is laminated to a paper or film face stock. Removal of the release liner allows the construction—face stock coated with adhesive —to be adhered to a substrate. The face stock and liner are a major cost of the label.

Many adhesives, such as those commonly used in label constructions, are not water dispersible or repulpable. Therefore, they make recycling of the label product difficult, due to the tendency of the adhesives to form globules during the repulping process. In addition, most PSAs are tacky when dry and cannot readily be used with ink jet printers that have become so popular in today's world. Moreover, such PSAs typically are not hydrophilic, making it difficult to print on them directly with water-based ink jet printer inks. Instead, only the face stock or liner is ink-receptive. The unsuitability of such PSAs for use in ink jet printers is compounded by the tendency of the adhesives to block the printer ports in the printers.

Although attempts have been made to formulate moisture activated or water activated adhesives, many of the adhesives produced have been rubber based and, therefore, subject to oxidative and UV degradation. Many rubber-based and other adhesives have been solvent borne, and thus objectional for environmental, health and safety reasons. The following patents are representative. U.S. Pat. No. 3,681,179 to Theissen discloses a solar control film construction having a water-activatable adhesive system comprising a normally tacky and pressure-sensitive adhesive coating covered by a thin, tack-free continuous water-soluble layer. A tack free emulsion acrylic adhesive is not disclosed.

European Patents Nos. 199,468 and 297,451 describe a method for compounding water-activatable hot melt adhesives comprising polyaklylenimine or other vinyl heterocyclic monomers, a hydroxy-substituted organic compound, a plastizier, tackifier, and filler, and an antioxidant. No mention is made of making water activatable emulsion acrylic adhesives.

U.S. Pat. Nos. 4,331,576 and 4,325,581 to Colon et al. disclose common water-soluble hot melt adhesives based on polymers containing vinyl pyrrolidone and other heterocyclic monomers. Emulsion acrylics are not disclosed.

U.S. Pat. Nos. 4,052,368 to Morrison and 4,172,824 to Harrington describe water sensitive hot melt adhesives including polyester-based adhesives which typically comprise a copolyester in combination with a plasticizer. The systems are not emulsion acrylics.

None of the above-identified patents disclose or suggest the possibility of making a hydrophilic, acrylic emulsion polymer that is non-tacky when dry and water-activatable to become an adhesive, and that can be used in a "label-less" or "liner-less" construction, i.e., a construction in which either a face stock or a liner is not required.

SUMMARY OF THE INVENTION

In accordance with the present invention, there are provided hydrophilic, repulpable, acrylic polymers which are non-tacky when dry but become tacky when wet, and which exhibit high peel strength and excellent adhesion to a diverse array of substrates, including paper, polymer films, and highly polar substrates such as stainless steel and glass. In one embodiment of the invention, the composition comprises an acrylic-based polymer prepared by emulsion polymerization of a monomer mixture comprising, based on the total weight of monomers, from about 40 to about 70% by weight of one or more alkyl acrylates, the alkyl group of which has from 4 to about 8 carbon atoms; from about 10 to about 20% by weight of methyl acrylate; from about 2 to about 15% by weight of vinyl acetate; from about 10 to about 25% by weight of methacrylic acid and/or acrylic acid; and a positive amount up to about 30% by weight, of methyl methacrylate. In another embodiment, the monomer mixture additionally contains a positive amount, up to about 5% by weight, of a short chain hydroxyalkyl methacrylate, such as hydroxyethyl methacrylate. Unexpectedly, the presence of methyl methacrylate appears to enhance the "clean break" between water-activated regions of the polymer layer and non-activated regions, a phenomenon described in more detail below.

The acrylic emulsion polymers of the present invention are calculated to have a relatively high glass transition temperature ($T_g$)—as high as about 40° C., for some formulations—and a weight average molecular weight of from about 100,000 to about 200,000. Because of their high glass transition temperatures, the polymers are not tacky at room temperature, when dry. But the polymers are highly polar and, when exposed to moisture, such as the water in an aqueous ink jet printer ink, they become tacky. The polymers are hydrophilic and repulpable, water-activatable and transparent to visible light. They may be directly printed upon using a water-based ink, and after activation and adhesion to a substrate, can be removed from a substrate by application of water. They are particularly useful as ink jet-imprintable polymers converted into adhesives used in a variety of constructions, including "label-less" or "linerless" labels, security films, solar control films, beverage labels (where it is desirable to have a transparent label on a clear bottle), decorative adhesive image sheets, and the like.

In another aspect of the invention, an ink jet-imprintable, water-activated adhesive construction is provided. In one embodiment, the construction comprises a layer of water-activatable acrylic polymer, coated on a flexible substrate, which in some embodiments is a release liner, such as an inherently releasable film, or a paper or film backing coated with a silicone or other release material. The water-activatable layer is non-tacky when dry, but becomes tacky when exposed to water. Consequently, when printed with a water-based ink jet printer ink, the polymer layer becomes tacky within the region of the printed image, but not in other regions not directly printed on. When applied to a substrate, this allows a clean break between imaged (printed) and unimaged (unprinted) regions of the adhesive, and the ability to form a "label-less" label on a substrate.

The construction is useful as a label or decorative image sheet, and is applied to an object or surface by adhering the water-activated polymer (which is now tacky) to the object and, optionally, removing some or all of the flexible substrate or liner. In one embodiment, the construction includes a water insoluble, transparent film layer, preferably of a polymeric material, disposed between the water-activatable polymer and a release liner. Alternately, the water insoluble layer is used in place of the release liner, as a flexible substrate.

Other features and advantages of the invention will become apparent from a consideration of the following detailed description and the accompanying drawings.

BRIEF DESCRIPTION OF THE DRAWINGS

FIG. 1 is a schematic illustration of the configuration and use of one embodiment of an ink jet-imprintable, water-activated construction prepared in accordance with the present invention.

FIG. 2 is a schematic illustration of the configuration and use of a second embodiment of an ink jet-imprintable, water-activated construction prepared in accordance with the present invention.

DETAILED DESCRIPTION OF THE INVENTION

The present invention provides acrylic polymers that are non-tacky when dry, hydrophilic, water repulpable, and water activatable to become tacky—even by a small amount of moisture. When activated by water, the polymers become tacky. When applied to a substrate, the activated adhesives exhibit high peel strength, yet are removable by further application of water. Advantageously, the adhesives are ink jet imprintable, as well as transparent to visible light.

In one embodiment of the invention, the activatable composition comprises an emulsion polymer formed from a monomer mixture comprising, based on the total weight of monomers, (a) from about 40 to about 70% by weight of at least one alkyl acrylate, the alkyl group of which has from 4 to about 8 carbon atoms; (b) from about 10 to about 20% by weight of methyl acrylate; (c) from about 2 to about 15% by weight of vinyl acetate; (d) from about 10 to about 25% by weight of methacrylic acid, acrylic acid, or a mixture of methacrylic and acrylic acid; and (e) a positive amount—up to about 30% by weight based on the total weight of monomers—of methyl methacrylate. In another embodiment, the monomer mixture further comprises (f) a positive amount—up to about 5% by weight—of a short chain hydroxyalkyl methacrylate. Both embodiments are highly polar, and the resulting monomers are hydrophilic.

The identity and relative amounts of monomers used to form the polymer are selected such that the polymer has a high enough glass transition temperature ($T_g$) and/or properties (e.g., high plateau modulus) that the polymer is non-tacky at room temperature when dry. To that end, it is preferred to maximize the relative amounts of methyl methacrylate, vinyl acetate, and/or acid monomers, relative to the amount of alkyl acrylate(s) used. Thus, in one preferred embodiment, the monomer mixture includes at least 0.5%, more preferably 10%, by weight of methyl methacrylate and the polymer's $T_g$ can be as high as about 40° C. In another preferred embodiment, as much as 20% to about 30% by weight of methyl methacrylate is included, as a means of increasing $T_g$ and enhancing the "clean break" feature of the activated adhesive. In other embodiments, however, the amount of methyl methacrylate may be much lower—as low as even 0.1% by weight—and $T_g$ of the polymer is raised through the effect of other monomers.

It is preferred to employ a mixture of alkyl acrylates as the first monomeric component. Useful alkyl acrylates include n-butyl acrylate, 2-ethylhexyl acrylate, isooctyl acrylate, and the like. A mixture of 2-ethylhexyl acrylate and butyl acrylate is preferred. Similarly, it is preferred to employ a mixture of acrylic and methacrylic acid as the fourth monomeric component of the polymer.

In those embodiments where a hydroxyalkyl methacrylate monomer is employed, the monomer has a short chain alkyl group containing from 2 to about 6 carbon atoms, with hydroxyethyl methacrylate (HEMA) being preferred. The amount of HEMA that can be employed is limited by its effect on viscosity and pre-emulsion stability. In general, the concentration is kept below about 5%, more preferably about 4%, based on the total weight of monomers.

The acrylic polymers of the present invention are prepared in a conventional manner, using unreactive surfactants or, more preferably, a mixture of unreactive and reactive surfactants, the latter copolymerizing with the monomers and becoming part of the emulsion polymer. Representative conventional surfactants include anionic surfactants such as Polystep B-27, an aqueous solution of the sodium salt of nonylphenoxy polyethyleneoxyethanol sulfate, available from Stepan Company (located in Winnetka, Ill.) nonionic surfactants such as AR 150, a nonionic ethyleneoxide adduct of pale wood rosin, available from Hercules, Inc. (located in Wilmington, Del.); and mixed anionic/nonionic surfactants, such as Polystep J-927, a mixture of Polystep B-27 and Polystep F-9 (nonylphenol ethoxylate), also sold by Stepan Chemicals. Up to about 10% by weight of surfactants is typically added. Good repulpability has been obtained with 8% surfactants; as measured by TAPPI UM 213.

Preferred reactive surfactants are anionic vinyl functional surfactants, such as sodium vinyl sulfonate and sodium styrene sulfonate. Reactive surfactants tend to enhance cohesive strength of the resulting copolymer, and aid in the copolymerization process. When used, reactive surfactants are typically employed in an amount of between about 0.5% and 1.5% by weight, preferably about 1%, based on the total weight of monomers.

Polymerization initiators or catalysts are advantageously added to speed the copolymerization of the monomers. Useful polymerization initiators include, without limitation, tert-butyl hydroperoxide (t-BHP) and potassium persulfate (KPS). In some embodiments, a molecular weight regulator is added to the monomer mixture to control average polymer chain length. Useful regulators include n-dodecyl mercaptan (n-DDM) and similar compounds. Other agents and additives can be added to facilitate more efficient, controlled emulsion polymerization, including oxidants such as hydrogen peroxide and iron ethylenediaminetetraacetic acid (Fe EDTA), reducing agents such as sodium formaldehyde sulfoxylate (available from Henkel of America, Inc., King of Prussia, Pa.), and post-polymerization agents such as ascorbic acid. Ascorbic acid forms a redox system with t-BHP (which is an oxidant), and facilitates removal of residual monomers after polymerization). Before filtering the reaction mixture, a biocide, such as Kathon LX (available as a 1.5% solution from Rohm & Haas Co., Philadelphia, Pa.) can be added to prevent bacterial growth.

The emulsion polymers are prepared with excellent conversions at a reaction temperature of around 70° C., in the presence of from about 0.5 to about 1% by weight, based on the weight of the monomers, of a persulfate or equivalent catalyst, with the monomer mixture being fed over a period of about 2–4 hours. Reaction pH preferably is adjusted by addition of sodium bicarbonate or a similar agent, to within a range of from about 4.0 to about 6.0.

While actual production techniques may vary depending upon particular monomer compositions, available equipment, and other considerations, in general, the emulsion polymers are prepared by first mixing one or more pre-emulsions containing conventional surfactants, sodium bicarbonate, and some or all of the monomers in deionized water; adding reactive surfactants and other reactor ingredients (e.g., Fe EDTA, AR 150, hydrogen peroxide) to a reactor under nitrogen; heating the reactor to 70° C.±2° C. and then adding a pre-emulsion charge, over time (preferably in stepped or mixed feed sequences); adding an initiator charge containing, for example, potassium persulfate; continuing the pre-emulsion feeds and addition of any accelerators; adding any post-reaction charges (e.g., t-BHP, ascorbic acid, and more water); cooling the reactor contents to below 35° C.; adding the biocide; and filtering the emulsion polymer.

Using the emulsion polymerization techniques described above, several exemplary embodiments of the present invention were prepared. The monomeric compositions of the emulsion polymers are presented in Table I. Examples 1A–1H contain alkyl acrylates, methyl acrylate, vinyl acetate, methacrylic acid and/or acrylic acid, and methyl methacrylate. Example 2 additionally contains hydroxyethyl methacrylate. Pilot scale-up of Example 1E yielded an emulsion polymer with a solids content of about 58%, a viscosity of about 200 cps, and a pH of about 5.5. One percent by weight of n-DDM was used as a chain transfer agent in a pre-emulsion used to prepare the polymer.

TABLE I

Monomeric Composition of Emulsion Acrylic Polymers (% by wt., rounded)

| MONOMER | 1A | 1B | 1C | 1D | 1E | 1F | 1G | 1H | 2 |
|---|---|---|---|---|---|---|---|---|---|
| Butyl acrylate | 22 | 24 | 23 | 24 | 24 | 26 | 24 | 24 | 24 |
| 2-Ethylhexyl acrylate | 40 | 38 | 36 | 36 | 36 | 22 | 21 | 16 | 16 |
| Methyl acrylate | 14 | 15 | 14 | 15 | 15 | 16 | 14 | 15 | 15 |
| Vinyl acetate | 6 | 6 | 6 | 6 | 6 | 7 | 6 | 7 | 6 |
| Methacrylic acid | 9 | 8 | 9 | 10 | 10 | 10 | 9 | 10 | 9 |
| Acrylic acid | 5 | 5 | 7 | — | 0.4 | 1 | 1 | 1 | 2 |
| Methyl methacrylate | 2 | 4 | 4 | 10 | 10 | 18 | 25 | 28 | 28 |
| Hydroxyethyl methacrylate | — | — | — | — | — | — | — | — | 2 |

Using standard Pressure-Sensitive Tape Council (PSTC) test procedures, 90° peel, loop tack and shear were measured for Example 1E (after activation with water), applied at a coat weight of 20 grams per square meter. Static shear from stainless steel was measured using a ½"×½" test area on longer test strips. 90° peel and loop tack were measured from stainless steel, high density polyethylene (HDPE), glass, and corrugated board surfaces. The results are presented in Table II, where the observed adhesion failure modes—face stock failure (FS) and panel failure (P)—are given in parentheses.

TABLE II

Peel, Tack and Shear Data for Ex. 1E After Water Activation

| | 90° Peel (lbs/in.) After 20 min. Dwell | 90° Peel (lbs/in.) After 24 hr. Dwell | Loop Tack (lbs/in.) | Shear from Stainless Steel (minutes) |
|---|---|---|---|---|
| Stainless Steel | 0.32 (FS) | 0.55 (FS) | 0.03 (P) | >20,000 |
| HDPE | 0.05 (P) | 0.03 (P) | 0.05 (P) | NA |
| Glass | 0.23 (FS) | 0.08 (P) | 0.07 (P) | NA |
| Corrugated board | 0.05 (P) | 0.03 (P) | NA | NA |

Referring now to the drawings, FIGS. 1 and 2 are schematic illustrations of the configuration and use of two different embodiments of an imprintable, water-activatable adhesive construction prepared in accordance with the present invention. Referring to FIG. 1(a), an imprintable adhesive construction 12 includes a layer of water-activatable polymer 14 coated on or otherwise applied to a release liner 16. The polymer layer 14 has an inner face 14a and an outer face 14b, and preferably comprises a water-activatable acrylic emulsion polymer as described above. The polymer layer is non-tacky when dry, but hydrophilic, water-activatable and ink absorbent—i.e., imprintable. Alternatively, the polymer layer 14 is some other water-activated material, such as a mixture of approximately 75% polyvinyl alcohol (PVOH) and 25% polyacrylic acid. In each case, the polymer is applied to the release liner in a conventional manner, then dried to form a thin film-like layer 14.

The release liner 16 has a conventional nature and may comprise, for example, a paper or other flexible plastic backing, such as a Mylar™ film, coated with a release material, such as polydimethylsiloxane, another silicone, or a non-silicone material, such as polyvinyl octadecyl carbamate. Alternatively, the release liner can comprise a film of inherently releasable material. Some polymer films have a sufficiently low shear modulus to be useful as release liners without the use of a release coating. (See, for example, U.S. Pat. No. 4,339,485, which is incorporated by reference herein.) The release liner 16 has an inner or "front" face 16a (sometimes called the "release face") and an outer or "back" face 16b.

It will be appreciated that the thicknesses of the respective layers 14 and 16 are grossly exaggerated in the figures. In practice, the constructions may be prepared as thin sheets or rolls, like a sheet of labels where, for example, the polymer layer 14 has a thickness of between 0.5 and 2 mils, and the release liner or other release carrier has a similar small dimensional thickness.

When the construction 12 is dry, it is non-tacky. However, it is both hydrophilic and water-activatable, the latter term meaning that it becomes tacky when exposed to water, even a small amount of moisture, such as the water in a water-based ink. In FIG. 1, water-based ink 20 is ejected from a printer port 18 and forms a printed image 25 on the outer face 14b at the polymer layer. The water in the ink activates the polymer, making it tacky within the region of the printed image. This is shown in FIG. 1(b), where a cross-sectional view of the construction is depicted, and in FIG. 1(c), where a perspective view of the printed construction is shown. The parts of the polymer layer not exposed to ink remain untacky, and are designated as non-tacky or nonactivated regions 22. The formation of printed image 25 causes tacky regions 24 to form in the polymer layer. Because the polymer layer 14 is both thin and hydrophilic, it becomes activated across its entire cross-sectional thickness, from the outer face 14b to the inner face 14a. Thus, although printed on its outer face, it becomes tacky all the way through to the inner face.

The printed image 25 can be transferred directly to an object by simply removing the release liner and pressing the delaminated construction (which now consists of the adhesive layer 14 only) onto a surface, such as the window 30 depicted in FIG. 1(e). Alternatively, the release liner can be removed after the adhesive layer is adhered to a surface or object.

In one embodiment, only the imaged (printed) region becomes affixed to the object, that is, the water-activated regions 24 of the polymer layer (which are essentially coextensive with the imaged region) adhere to the object, and the remaining, nonactivated (non-tacky) regions 22 of the polymer layer can be easily pulled away and discarded. The effect is similar to application of a die-cut label, but appears to the eye as a "label-less" printing on the object or substance. This can result, for example, from the intrinsic internal cohesiveness of the polymer, and/or the manner in which the adhesive is applied to the release liner.

Thus, in one embodiment, the polymer simply has an internal cohesiveness or integrity which is sufficiently low to afford easy detachability of nonactivated regions from activated regions. This has been observed, for example, in constructions made with a formulation that includes methyl methacrylate in the polymer backbone, such as Examples 1A–1H, and 2, above. Unexpectedly, the presence of methyl methacrylate in the monomer composition appears to improve the clear break between activated and nonactivated regions of the polymer during image transfer, allowing the nonactivated regions to remain attached to the flexible substrate or liner, or simply discarded.

Alternatively, if the construction 12 is formed by applying the polymer 14 to the release liner 16 as a micro array of slightly separated droplets or dots, it is easy to strip the nonactivated regions 22 from the activated regions.

In another embodiment (shown in phantom in FIG. 1(e)), the nonactivated regions 22 of the adhesive layer remain attached to the activated regions 24 (which are coextensive with the image). The image 25 is adhered to the object by the activated adhesive regions 24, but the nonactivated regions 22 remain secured as well, though not adhesively bound to the object.

Once applied to a surface, the adhesive forms a high peel strength bond. Yet, because the adhesive is water-dispersible, repulpable and hydrophilic, it can be easily removed by application of water.

Referring now to FIG. 2, a schematic illustration of a different configuration of a imprintable, water-activated construction, and its use, is depicted. The construction 12' is similar in many ways to construction 12 of FIG. 1, and similar components are numbered as in FIG. 1. In the construction 12' of FIG. 2, however, there is also provided a layer of water insoluble or water-resistant material 26, having an inner face 26a and an outer face 26b, sandwiched between the layer of water-activatable polymer 14 and release liner 16. This construction is similar in most respects to that shown in FIG. 1, and its components have, for example, similar small dimensional thicknesses.

The water-resistant layer 26 can be opaque but, more preferably, is transparent, and can be formed, for example, of a polymeric material, such as Mylar™, or a similar flexible, durable, water insoluble material. Multilayer construction 12' is prepared in a conventional manner, for example, by laminating a release liner 16 to a water-resistant layer 26, and coating an adhesive layer 14 onto the outer face 26b of the water-resistant layer 26. The water insoluble, transparent film layer can even be used in place of the release liner, in some embodiments.

As in the embodiment depicted in FIG. 1, when the adhesive construction 12' is dry, it is non-tacky. However, when exposed to even a small amount of moisture, such as the water in a water-based ink, the polymer layer 14 becomes tacky (pressure-sensitive). Thus, it can be printed on and activated in the same manner as described above and shown in FIG. 1. In many embodiments, however, it is advantageous to print the image in reverse (as shown in FIG. 2(c)), for reasons that will now be described.

After the image is printed onto the construction, the release liner may be removed and the remaining two-layer sandwich can be adhered to an object. In those embodiments where the water-resistant layer 26 is transparent, the importance of reverse printing becomes apparent. As shown in FIG. 2(e), a printed image construction 28 is adhesively attached to a bottle 40, with the activated regions 24 of the polymer layer in direct contact with the bottle, and the water-resistant layer 26 outwardly disposed therefrom. The image 25' is visible through, and protected by, the transparent water-resistant layer 26. Had the image not been reverse printed, it would appear to be "backwards" once the printed image construction 28 was attached to the bottle, at least from the perspective of viewing it directly, rather than through the bottle. Reverse image printing corrects this problem. Software for reversing the image of both text and pictures is commercially available from Adobe, under the mark Photo Deluxe. Image reversing share ware, such as "L-View," can be downloaded from the Internet.

The present invention has been described and illustrated in several examples and embodiments, but is not limited thereto. A person having ordinary skill in the art to which this invention pertains will appreciate that variation and modification of the compositions, materials, dimensions and other elements recited herein can be practiced without departing from the invention. For example, the ink receptivity of the adhesive can be enhanced by coating a thin (0.1 to 0.3 micron) layer of polyvinyl alcohol, poly-hydroxyethyl methacrylate (p-HEMA), or similar hydrophilic polymer on the outer face 14b of the adhesive layer. (If p-HEMA is employed, it should be applied as a dilute—less than 5%—solution, to avoid incompatibility with the emulsion polymers.) Such a coating, when dry, also provides a protective layer for the construction, particularly if the construction is self-wound.

A PVOH-coated, self-wound construction has been prepared, using biaxially oriented polypropylene (BOPP) as both a transparent, water insoluble film layer and a release liner, and the acrylic polymer corresponding to 1E, above. More particularly, a 50 micron thick BOPP film, having a high energy side (38 dyne/cm surface tension) and a low energy side (32 dyne/cm surface tension) was coated with the adhesive, at a coat weight of 25 grams per square meter ($g/m^2$), or approximately 25 microns thick.

Two samples (I and II) were prepared by coating the low surface energy side of the BOPP film with acrylic polymer. The high energy surface energy side (the "back" side) was corona treated and coated with a thin (<0.1 microns thick) layer of polyvinyl octadecyl carbamate (PVODC), a non-silicone release material. Alternatively, other release materials, can be used. After the acrylic polymer was dried, Sample I was coated with a thin layer of PVOH, having a solids content of 1%, at a coat weight of less than 0.24 g/m$^2$. Sample II was coated with a thin layer of PVOH having a solids content of 3%, at a coat weight of less than 0.12 g/m$^2$.

Two other samples (III and IV) were prepared by coating the acrylic polymer on the high surface energy side of the BOPP film. No release coating was needed on the back side of the BOPP film, due to its low surface energy. After the polymer was dried, Sample III was coated with 3% solids PVOH (<0.24 g/m$^2$ coat weight), and Sample IV was coated with 1.5% solids PVOH (<0.12 g/m$^2$ coat weight).

All four samples were fed through an ink jet printer and imaged directly on the PVOH surface. Due to ink absorption through the PVOH and water-activatable polymer layers, the polymer became tacky, and the image could be transferred to a substrate as a "label-less" label, separated from the non-imaged part. The transparent, water insoluble BOPP film protects the image while allowing it to be viewed when adhered to a substrate.

It will be appreciated that this aspect of the invention is not limited to constructions made with biaxially oriented polypropylene, but has a broader scope that encompasses polymeric films in general, preferably transparent, water insoluble films, including other polyolefins, polyesters, polystyrenes, and the like. All such films have a front side and a back side. The relative surface energy of the two sides may be equal or unequal, i.e., a given film may have a low energy side and a high energy side. Similarly, other release coatings may be used in place of polyvinyl octadecyl carbamate. Such coatings are known in the art, and include silicones and other materials.

In some embodiments, it is advantages to score or die cut the release liner and/or the water insoluble layer, in which case removal (delamination) of the release liner from the adhesive becomes unnecessary.

The present invention is not limited to use with ink jet printers, but may be utilized with similar printers and water-based inks. Nor is the term "print" or derivatives thereof to be read as limited to text, i.e., alpha-numeric characters. To the contrary, the adhesives and constructing described herein are intended to be used in a variety of applications, where all manner of graphic, as well as textual, images may be desired. Other variations and modifications also fall within the scope of the invention, which is limited only by the following claims.

What is claimed is:

1. A water-activatable, acrylic composition, comprising:
    a polymer formed from a mixture of monomers comprising, based on the total weight of monomers,
        (a) from about 40 to about 70% by weight of one or more alkyl acrylates, the alkyl group of which has from about 4 to about 8 carbon atoms;
        (b) from about 10 to about 20 percent by weight of methyl acrylate;
        (c) from about 2 to about 15 percent by weight of vinyl acetate;
        (d) from about 10 to about 25 percent by weight of methacrylic acid, acrylic acid, or a mixture of methacrylic and acrylic acid; and
        (e) a positive amount up to about 30 percent by weight, of methyl methacrylate; said polymer being non-tacky at room temperature when dry, but tacky when wet.

2. A composition as recited in claim 1, wherein the monomer mixture further comprises a positive amount up to about 5 percent by weight, based on the total weight of monomers, of a hydroxyalkyl methacrylate.

3. A composition as recited in claim 2, wherein the hydroxyalkyl methacrylate comprises hydroxyethyl methacrylate.

4. A composition as recited in claim 1, wherein the alkyl acrylate is selected from the group consisting of butyl acrylate, ethylhexyl acrylate, isooctyl acrylate, and mixtures thereof.

5. An imprintable construction suitable for use in an ink jet printer, comprising:
    a water-activatable, acrylic composition as recited in any one of claims 1–4, coated on a release liner.

6. An imprintable construction as recited in claim 5, further comprising a flexible water insoluble film sandwiched between the acrylic composition and the release liner.

7. An imprintable construction as recited in claim 6, wherein the water insoluble film is transparent.

8. An imprintable construction suitable for use in an ink jet printer, comprising:
    a water-activatable, acrylic composition as recited in any one of claims 1–4, coated on a transparent, flexible, water insoluble substrate.

9. An imprintable construction as recited in claim 8, wherein the water insoluble substrate is a polymeric film.

* * * * *

UNITED STATES PATENT AND TRADEMARK OFFICE
CERTIFICATE OF CORRECTION

PATENT NO. : 5,969,069
DATED : October 19, 1999
INVENTOR(S) : Shiaonung Su, H. Paul Barker, Ghanshyam H. Popat and Raymond G. Kubit It is certified that error appears in the above-identified patent and that said Letters Patent is hereby corrected as shown below:

<u>Title page,</u>
Item [75], Inventors should read
-- Shiaonung Su, Buena Park; H. Paul Barker, La Canada; Ghanshyam H. Popat, Alta Loma; Raymond G. Kubit, Yorba Linda, all of Calif. --

Signed and Sealed this

Second Day of July, 2002

*Attest:*

JAMES E. ROGAN
*Attesting Officer*   *Director of the United States Patent and Trademark Office*